Dec. 2, 1958 W. STRAUSS 2,862,240
STUFFING MECHANISM FOR INJECTION MOLDING PRESS
Filed Oct. 22, 1956 2 Sheets-Sheet 2
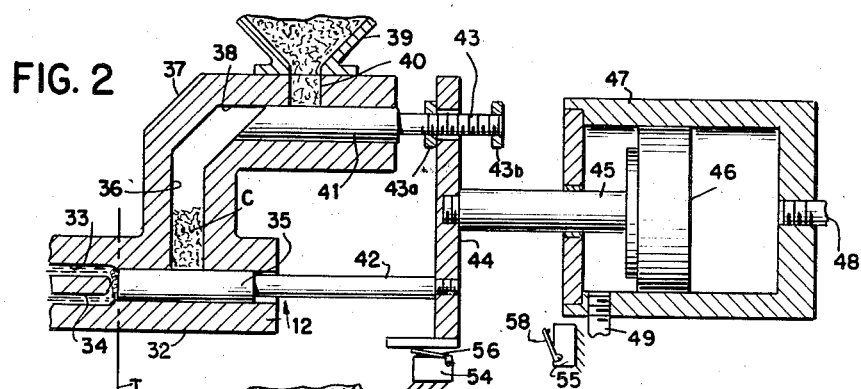
FIG. 2
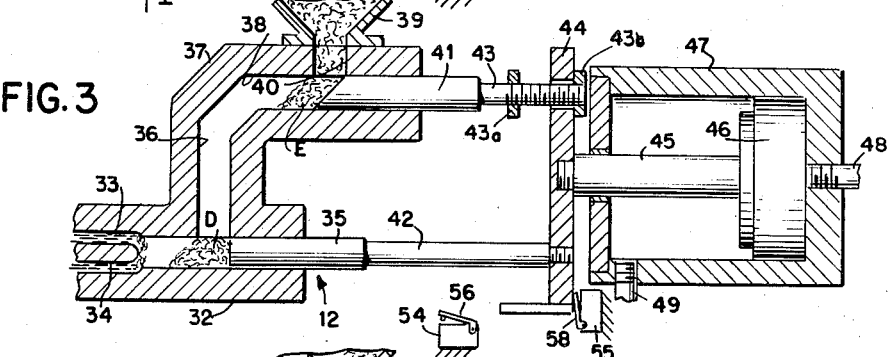
FIG. 3
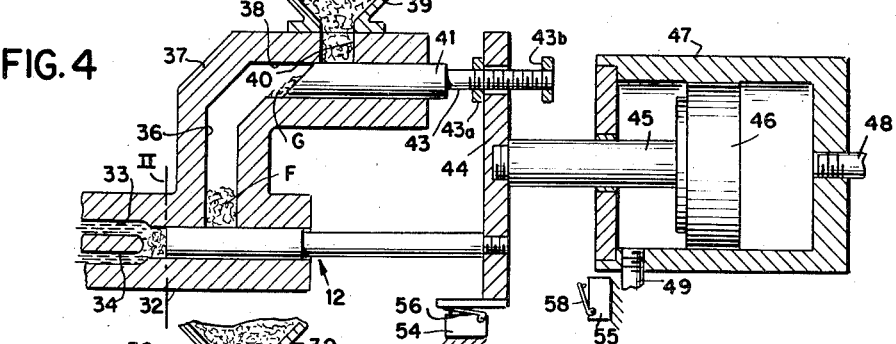
FIG. 4
FIG. 5
INVENTOR.
William Strauss
BY
Adams, Forward & McLean
ATTORNEYS United States Patent Office 2,862,240
Patented Dec. 2, 1958

2,862,240

STUFFING MECHANISM FOR INJECTION MOLDING PRESS

William Strauss, Philadelphia, Pa., assignor to F. J. Stokes Corporation, Philadelphia, Pa., a corporation of Pennsylvania Application October 22, 1956, Serial No. 617,383

3 Claims. (Cl. 18—30)

My invention relates to injection molding of thermoplastic materials and in particular provides a stuffing mechanism for an iinjection molding press.

In the injection molding of thermoplastic materials and the like it is necessary to force pulverant molding material, with sufficient heat and pressure to render the material fluent, into one or more die cavities in a mold. Customarily the mechanism for heating and pressuring the molding material includes a heated chamber through which a ram which is reciprocable to force molding material through the chamber and a nozzle leading to the mold. Frequently the ram is operated with a stuffing action, that is, it makes a series of strokes picking up additional molding material from a feed device with each stroke. One of the characteristics of any such injection molding press is that a substantial pressure drop occurs along the length of the nozzle and heating chamber. It is, therefore, highly important that the final stroke of a ram utilizing a stuffing action terminate with the face of the ram at a predetermined location along the length of the heating chamber, since the smallest deviation from such location can have substantial effect on the pressure on the material injected into the mold. Should the final position of the ram enter the heating chamber too far an overshot occurs; should the final position of the ram be insufficiently introduced into the heating chamber an undershot occurs.

There have, heretofore, been two principal systems employed to control the final position of the ram at the termination of its last stuffing stroke. In the first of these a limit device is positioned such that it is tripped every stroke exactly at the predetermined final position of the ram to cause the ram to withdraw from the heating chamber, pick up additional molding material and return into the heating chamber carrying the additional molding material with it. This operation is, of course, repeated until finally sufficient molding material has been stuffed into the heating chamber to prevent the ram from entering the heating chamber a sufficient distance to trip the limit device whereupon the stuffing action is completed. This system is subject to the disadvantage that, since a given quantity of molding material is introduced on each stroke of the ram, the final position of the ram may vary from a position just short of tripping the limit device to a position in which almost a single charge of material lies between the ram and the position at which the ram just trips the limit device. The other system employs a proportionating feed in which the amount of material introduced in each stroke of the ram is proportional to the length of the stroke. Thus when the heating chamber is relatively empty and the ram makes a long stroke a substantial charge is introduced. As each succeeding charge is stuffed into the heating chamber the stroke of the ram becomes shorter and the amount of material fed is proportionally less. Since the bulk factor of the molding material can never be accurately estimated, and in fact may vary with the charge delivered with each stroke, this system also results in the final position of the ram deviating substantially from the determined optimum.

It is a principal object of my invention to provide a stuffing mechanism for an injection molding press in which the ram accurately can be stopped at the end of the stuffing operation at any predetermined final position without significant deviation from such position.

It is a further object of my invention to provide a stuffing mechanism in which the final position of the ram can be independent of the length of time the stuffing operation requires, the number of stuffing strokes and the deviations in bulk factor of the molding material.

These and other objects of my invention are fundamentally achieved utilizing a stuffing mechanism having a self compensating feed and a liimt device (proportionating) feed and a liimt device, but featuring a time lapse, such that the quantity of molding material introduced on each successive stroke is proportional to the length of the stroke and such that restroke occurs after tripping the limit device when the ram has had time to stuff the charge completely into the heating chamber.

These and other objects of my invention which will be apparent hereinafter, are more fully illustrated with reference to the appended drawings in which:

Figure 2 is a fragmentary view similar to Figure 1 showing the position of the stuffing mechanism after the initial stroke;

Figure 3 is a view similar to Figure 2 showing the position of the stuffing mechanism after the ram is withdrawn from the initial stroke;

Figure 4 is a view similar to Figures 2 and 3 showing the position of stuffing mechanism after the completion of another stroke;

Figure 5 is a view similar to Figures 2–4 showing the position of the stuffing mechanism after withdrawal from the position shown in Figure 4; and Figure 6 is a view similar to Figures 2–5 showing the position of the stuffing mechanism after the final stroke.

Figure 1:
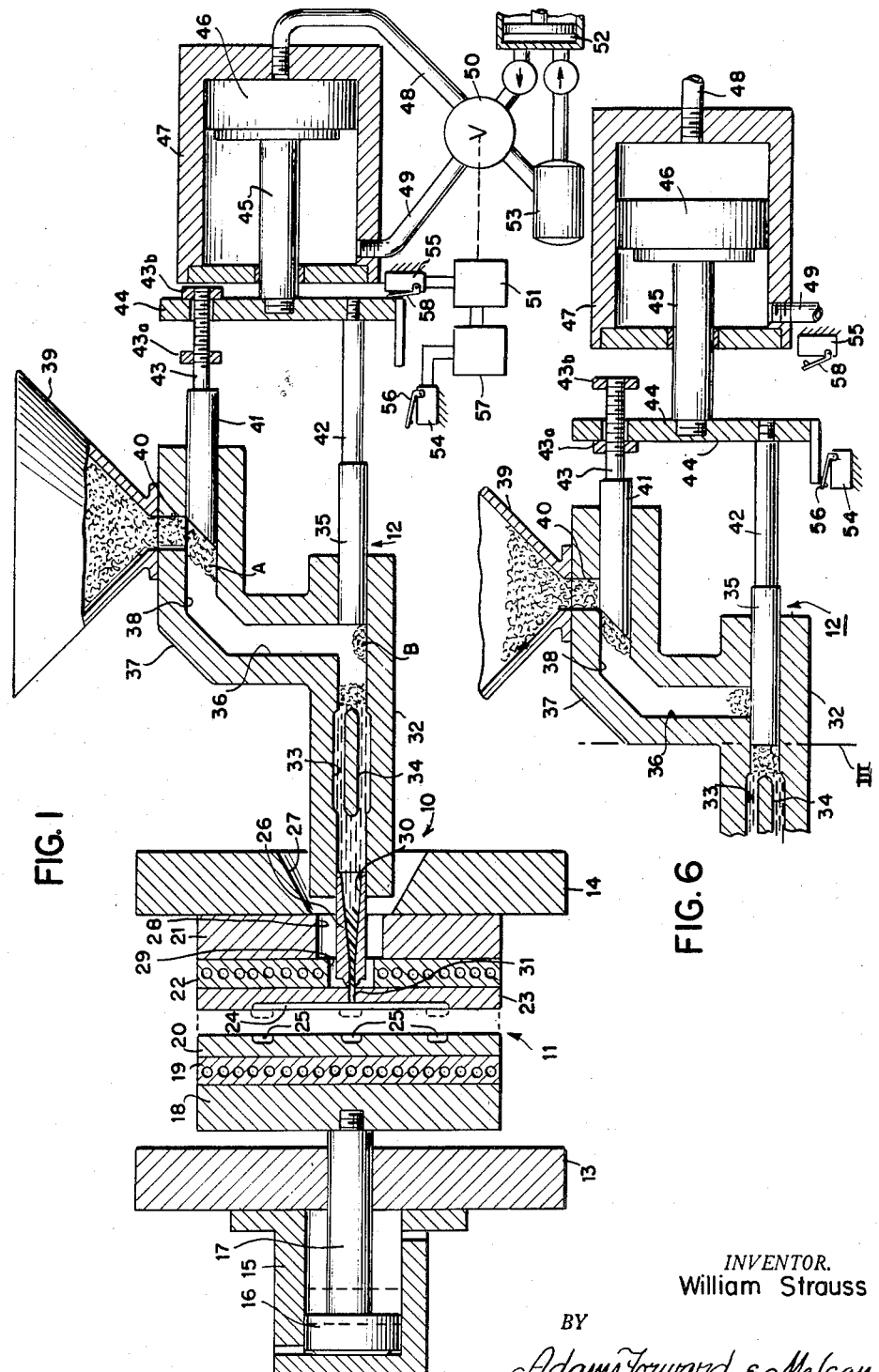
Figure 1 is a cross-sectional view of an injection molding press incorporating a stuffing mechanism embodying the principles of my invention.

In the drawings the reference numeral 10 designates an injection molding press having a mold 11 and a stuffing mechanism 12.

Press 10 includes a pair of fixed vertical abutments 13 and 14. Abutment 13 on its outer face carries a hydraulic cylinder 15 in which a piston 16 is horizontally reciprocable. Piston 16 drives a piston rod 17 which extends through abutment 13 and terminates beyond the inside face of abutment 13 in a horizontally reciprocable platen 18 which carries on its inside face a cooling plate 19 and a die plate 20. Mounted on the inside face of abutment 14 is a fixed platen 21 which carries a cooling plate 22 and die plate 23 confronting die plate 20. A runner channel 24 is formed on the inside face of die plate 23 confronting die plate 20, and die plate 20 is provided on its face confronting die plate 24 with a plurality of die cavities 25 which register with runner channel 24.

Stuffing mechanism 12 is mounted on the outside face of abutment 14 and includes an injection nozzle 26 projecting through central openings 27, 28 and 29 in abutment 14, fixed platen 21 and cooling plate 22, respectively. Nozzle 26 is provided with a tapered bore 30 the outer end of which abuts the outer face of die plate 23 registering with a reverse tapered sprue channel 31 extending through plate 23 leading to runner channel 24.

Stuffing mechanism 12 also includes a heating cylinder 32 provided with a central bore 33 into one end of which nozzle 26 is fixed. A heating mandrel 34 is mounted in bore 33. Other heating devices of conventional construction can also be used to assist in rendering materials passing through bore 33 in a heated, fluent condition. A heating mantle can, for example, be extended about heating cylinder 32.

The end of heating cylinder 32 remote from nozzle 26 is provided with a ram, i. e. piston 35 which is horizontally reciprocable in bore 33 in tight sliding engagement with the inner walls of bore 33. A vertical feed bore 36 is provided communicating at its lower end with bore 33 along the length of bore 33 into which ram 35 reciprocates. Bore 36 extends out of heating cylinder 32 into a feed leg 37 attached to cylinder 32 in which bore 36 is turned to a horizontal position to form a horizontal feed bore 38. A feed hopper 39 is mounted above feed leg 37 with its lower end communicating through a vertical port 40 in feed leg 37 with horizontal bore 38. A feed piston 41 extends into the end of bore 38 for horizontal reciprocation in sliding engagement with the walls of bore 38.

Both pistons 35 and 41 are carried on parallel piston rods 42 and 43 respectively, which are mounted in a vertical yoke 44, piston rod 42 being affixed to yoke 44 and rod 43 being slidingly received by yoke 44 between a pair of stop nuts 43a and 43b mounted on rod 43. Yoke 44 is horizontally reciprocable by means of piston rod 45 attached to yoke 44 and carried by a piston 46 which is horizontally reciprocable in a hydraulic cylinder 47.

The hydraulic connections 48 and 49 to cylinder 47 lead through a two way reversing valve 50 controlled by an electrical control circuit 51 and a pair of limit switches 54 and 55 to a hydraulic pump 52 and reservoir 53. Switch 54 is positioned such that its actuating element 56 is tripped by yoke 44 precisely at the position of yoke 44 at which ram 35 is in its desired position at the end of the stuffing action. A time delay circuit 57 actuated by the tripping of switch 54, actuates circuit 51 after a predetermined time lapse to throw two way valve 50 into a position reversing the connection of conduits 48 and 49 to withdraw piston 46 and with it piston 41 and ram 35 away from mold 11. The actuating member 58 of switch 55 is positioned to be tripped by yoke 44 at the end of the withdrawal stroke of piston 46 to actuate circuit 51 immediately to reverse valve 50 and connect conduits 48 and 49 to cause piston 46 to restroke piston 41 and ram 35.

In operation with hopper 39 charged with pulverant molding material, piston 15 is reciprocated to close die plate 20 upon die plate 23 (dotted line position Figure 1). Thereupon circuit 51 is energized withdrawing piston 46. As yoke 44 actuates switch 55, piston 46 restrokes feed piston 41 and ram 35. The withdrawal prior to the restroke of feed piston 41 permits a charge of pulverant molding material to fall into horizontal feed bore 38 as denoted by the reference letter A in Figure 1. At the same time the withdrawal of ram 35 permits a small charge of material retained in vertical feed bore 36 to fall into bore 33 of heating cylinder 32 as denoted by the reference letter B in Figure 1.

Thus, on the restroke (see Figure 2) feed piston 41 forces the granular material from bore 38 into bore 36 as denoted by the reference letter C in Figure 2. At the same time the small charge B (Figure 1) is forced by ram 35 deep into heating cylinder 32. The first stroke terminates at a limiting position of piston 36 at which ram 35 stops short of contacting heating mandrel 34. This can be arranged by means of a limit switch, a stop or other conventional arrangement. The final position of the ram at the end of the first stroke is shown by the reference line I and results in forcing heated, fluent molding material remaining in bore 23 from a prior injection cycle into sprue channel 31, runner channel 24 and die cavities 25.

On the initial stroke yoke 44 trips actuating element 56 of switch 54 initiating operation of time delay circuit 57 which after a time elapse in excess of the time required to complete the stroke actuates circuit 51 to throw valve 50 to the position withdrawing piston 46, feed piston 41 and ram 35 to the positions shown in Figure 3. During the withdrawal stroke the quantity of molding material indicated by the reference letter C in Figure 2 drops into bore 33 in front of ram 35 as indicated by the reference letter D. This quantity of material is relatively large since on the initial stroke completed in Figure 2 feed piston 41 travelled the full permissible distance. Also on the withdrawal stroke an additional quantity of feed material falls into horizontal feed bore 38 through port 40 in front of feed piston 41 as denoted by the reference letter E. This quantity of material is essentially the same as that denoted by the reference letter A in Figure 1.

On the completion of the withdrawal stroke shown in Figure 3, the tripping of actuating element 58 causes switch 55 to connect circuit 51 in a manner reversing the connection of valve 50 thereby producing a restroke of piston 46. On the restroke of piston 46 (see Figure 4), ram 35 carries the material indicated by the reference letter D in Figure 3 into heating cylinder 32. The additional quantity of material thus carried into heating cylinder 32 prevents ram 35 from closing to line I, shown in Figure 2, and stops the ram at a line indicated by the reference line II. As a consequence, the travel of feed piston 41 on the restroke is insufficient to carry all the material denoted by the reference letter E in Figure 3 into vertical bore 36. The molding material shown in Figure 4 thus is divided into a portion F in vertical bore 36 positioned to be charged on the next subsequent stroke and a portion G remaining in feed bore 38. It will be noted that because the stroke of ram 35 was shorter on the restroke than on the initial stroke the quantity of material F, shown in Figure 4, is considerably less than the quantity of material C, shown in Figure 2, which was positioned for charging on the initial stroke.

As the restroke is completed, yoke 44 again actuates switch 54, and after the time delay piston 46 withdraws feed piston 41 and ram 35 to the position shown in Figure 5. Again the quantity of material H which falls into feed chamber 38 is substantially identical to that charged to the feed chamber before the initial stroke and before the restroke denoted by the reference letters A and E, in Figures 1 and 3, respectively. Also the small quantity of material G is present in feed bore 38 remaining there from the shorter feed stroke. At the same time the small quantity of material F which remained in vertical bore 36 falls into heating chamber 32 in bore 33 in front of ram 35 as denoted by the reference letter J.

As in the case of the initial withdrawal and the withdrawal stroke following the initial stroke the withdrawal subsequent to the restroke actuates switch 55 to cause piston 46 to restroke a second time driving feed piston 41 and ram 35 to the position shown in Figure 6 in which the final position of the front face of ram 35 approximates a line III. In assuming this position, ram 35 drives before it the charge of material J shown in Figure 5. Due to the additional charge of material J, the position of line III is rearward of the position of line II and the length of the stroke is even shorter than on the first restroke. On the second restroke, however, limit switch 54 is not tripped and no further withdrawal occurs, thus line III represents the final set position of ram 35 for the molding cycle.

While I have described a stuffing action including only three strokes, as a practical matter many more strokes will actually be used. Because of the slippage allowed between nuts 43a and 43b, the length of stroke of feed piston 41 can and should preferably be adjusted to give only a very short stroke as the final postion of ram 35 at the end of each restroke approaches line III. In this manner the incremental charge fed at each stroke can be made very small toward the end of the stuffing action with the results that variations in bulk factor have negligible effect and that it is possible to finish each stuffing operation with ram 35 positioned as close to line III as desired while at the same time requiring relatively few stuffing strokes to approach it.

Subsequent to completion of the final stroke mold 11 remains closed while coolant is circulated through cooling plates 19 and 22 to set the material injected into die cavities 25, runner 24 and sprue channel 31 in the conventional manner. Thereafter mold 11 is opened, the molded parts degated, and mold 11 is again closed ready for a new molding cycle.

I claim:

1. A stuffing mechanism which comprises a stuffing chamber including interior walls defining a bore therein, a ram mounted in said bore in sliding engagement with said walls, means defining a feed port through said walls into said bore, means for reciprocating said ram in said bore past said feed port, proportional feed means connected to said port for delivering a charge of material through said port into said bore when said ram is withdrawn in said bore past said feed port, the amount of said charge being proportional to the length of stroke of said ram in said bore, and means actuating said reciprocating means to withdraw said ram in said bore past said feed port and then to return said ram into said bore, said actuating means being responsive after a predetermined time lapse to the entry of said ram into said bore to a predetermined position.

2. A stuffing mechanism according to claim 1 in which said proportional feed means comprises means defining a vertical chamber connected at the lower end thereof to said port, means defining a horizontal chamber connected at one end thereof to the upper end of said vertical chamber, means defining a port in said horizontal chamber, a piston horizontally reciprocable in said horizontal chamber past said port in said horizontal chamber, and means for reciprocating said piston in timed relation with said ram.

3. A stuffing mechanism according to claim 1 in which said actuating means comprises a first limit sensing device actuated by entry of said ram in said bore to said predetermined position, and time delay control means responsive to actuation of said limit device after a predetermined time lapse to withdraw said ram past said feed port.

References Cited in the file of this patent

UNITED STATES PATENTS

| | | |
|---|---|---|
| 2,309,496 | Bird et al. | Jan. 26, 1943 |
| 2,760,232 | Rougemont et al. | Aug. 28, 1956 |